US011360632B2

(12) United States Patent
Arimatsu et al.

(10) Patent No.: US 11,360,632 B2
(45) Date of Patent: Jun. 14, 2022

(54) INFORMATION PROCESSING SYSTEM

(71) Applicant: Sony Interactive Entertainment Inc., Tokyo (JP)

(72) Inventors: Kazuyuki Arimatsu, Tokyo (JP); Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/960,989

(22) PCT Filed: Jan. 30, 2018

(86) PCT No.: PCT/JP2018/002969
§ 371 (c)(1),
(2) Date: Jul. 9, 2020

(87) PCT Pub. No.: WO2019/150429
PCT Pub. Date: Aug. 8, 2019

(65) Prior Publication Data
US 2021/0055815 A1    Feb. 25, 2021

(51) Int. Cl.
*G06F 3/045*    (2006.01)
*G06F 3/01*    (2006.01)

(52) U.S. Cl.
CPC .............. *G06F 3/045* (2013.01); *G06F 3/014* (2013.01); *G06F 3/015* (2013.01); *G06F 3/017* (2013.01); *G06F 2203/04104* (2013.01)

(58) Field of Classification Search
CPC .......... G06F 3/045; G06F 2203/04104; G06F 3/017; G06F 3/015; G06F 3/014
See application file for complete search history.

(56) References Cited

U.S. PATENT DOCUMENTS

| 10,042,387 | B2 | 8/2018 | Chen | |
| 2004/0032346 | A1* | 2/2004 | Kim | G06F 3/0304 341/20 |
| 2010/0219989 | A1* | 9/2010 | Asami | G06F 3/014 341/20 |

(Continued)

FOREIGN PATENT DOCUMENTS

| JP | 2007128304 A | 5/2007 |
| JP | 2010204724 A | 9/2010 |

(Continued)

OTHER PUBLICATIONS

International Search Report for corresponding PCT Application No. PCT/JP2018/002969, 4 pages, dated Apr. 3, 2018.

(Continued)

*Primary Examiner* — Patrick N Edouard
*Assistant Examiner* — Joseph P Fox
(74) *Attorney, Agent, or Firm* — Matthew B. Dernier, Esq.

(57) ABSTRACT

Provided is an information processing system including an application unit that applies a voltage to an application site of a user's body and a detection unit that detects a change in potential at a detection site of the user's body that is different from the application site in a state where the voltage is applied to the application site, and the information processing system determines a contact between a site of the user's body and another object on the basis of the change in potential detected by the detection unit.

7 Claims, 5 Drawing Sheets

(56) References Cited

U.S. PATENT DOCUMENTS

| | | | |
|---|---|---|---|
| 2010/0220054 A1* | 9/2010 | Noda | G06F 3/014 |
| | | | 345/156 |
| 2011/0007035 A1 | 1/2011 | Shai | |
| 2016/0048158 A1 | 2/2016 | Chen | |
| 2016/0364052 A1* | 12/2016 | Castellani | G06F 3/014 |

FOREIGN PATENT DOCUMENTS

| | | | |
|---|---|---|---|
| JP | 2010225131 A | 10/2010 | |
| JP | 2010537302 A | 12/2010 | |
| JP | 2017517084 A | 6/2017 | |

OTHER PUBLICATIONS

International Preliminary Report on Patentability and Written Opinion for corresponding PCT Application No. PCT/JP2018/002969, 11 pages, dated Aug. 13, 2020.

* cited by examiner (a)

(b)

INFORMATION PROCESSING SYSTEM

TECHNICAL FIELD

The present invention relates to an information processing system that acquires information related to a movement of a user's body, a detection device that constitutes the information processing system, an information processing apparatus, an information processing method, and a program.

BACKGROUND ART

Information processing apparatuses that detect a position of a finger of a user's hand or the like with a sensor or the like that optically detect a position of an object, and execute various processing depending on the detection result are known. According to such a technique, a user can perform an operation input to the information processing apparatus by moving the user's body, and more intuitive input can be achieved.

SUMMARY

Technical Problem

In the technique of the above-mentioned existing example, it is difficult to accurately detect that the user's body contacts another object or another site of his/her body.

The present invention has been made in consideration of the above-mentioned circumstances, and one of purposes of the present invention is to provide the information processing system, the detection device, the information processing apparatus, the information processing method, and the program that make it possible to accurately detect that a site of the user's body contacts another object.

Solution to Problem

The information processing system according to the present invention includes: an application unit that applies a voltage to an application site of a user's body; a detection unit that detects a change in potential at a detection site of the user's body that is different from the application site in a state where the voltage is applied to the application site; and a contact determination unit that determines a contact between a site of the user's body and another object on the basis of the change in potential detected by the detection unit.

The detection device according to the present invention includes: an application unit that applies a voltage to an application site of a user's body; and a detection unit that detects a change in potential at a detection site of the user's body that is different from the application site in a state where the voltage is applied to the application site, in which the change in potential detected by the detection unit is used to determine a contact between a site of the user's body and another object.

The information processing apparatus according to the present invention includes: an acquisition unit that acquires information regarding a change in potential detected at a detection site of a user's body that is different from an application site in a state where a voltage is applied to the application site of the user's body; and a contact determination unit that determines a contact between a site of the user's body and another object on the basis of the change in potential acquired by the acquisition unit.

The information processing method according to the present invention includes the steps of: acquiring information regarding a change in potential detected at a detection site of a user's body that is different from an application site in a state where a voltage is applied to the application site of the user's body; and determining a contact between a site of the user's body and another object on the basis of the change in potential acquired by the acquiring.

The program according to the present invention causes a computer to execute the steps of: acquiring information regarding a change in potential detected at a detection site of a user's body that is different from an application site in a state where a voltage is applied to the application site of the user's body; and determining a contact between a site of the user's body and another object on the basis of the change in potential acquired by the acquiring. This program may be provided by being stored in a computer-readable non-transitory information storage medium.

DESCRIPTION OF EMBODIMENT

Hereinafter, an embodiment of the present invention will be described with reference to the drawings. Note that, in the following description, a size, a ratio, an arrangement, and the like of each part are one example, and the examples of the present embodiment are not limited to the illustrated sizes, ratios, and arrangements.

Figure 1:
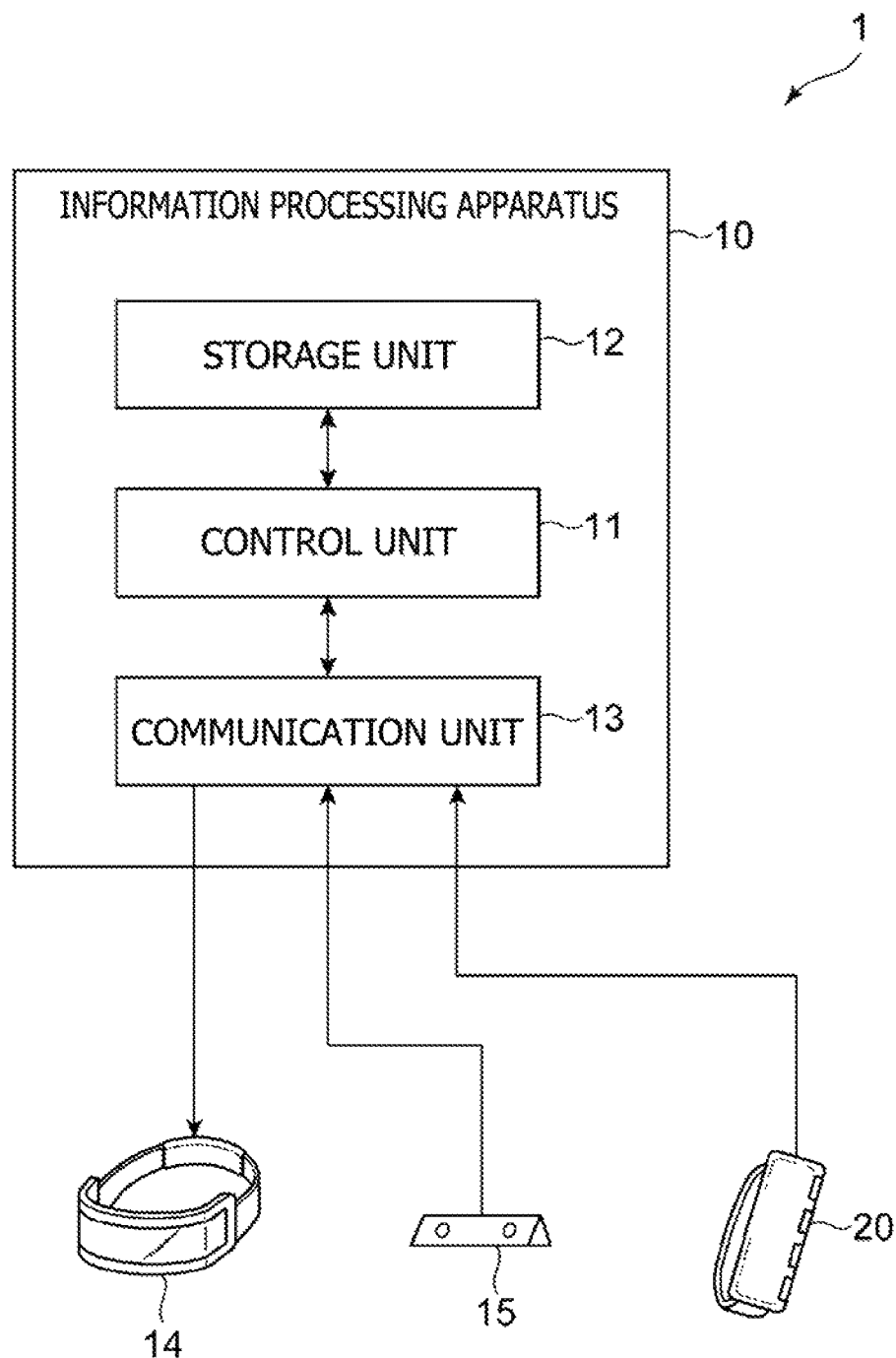
FIG. 1 is a block diagram illustrating a whole configuration of an information processing system according to an embodiment of the present invention.

FIG. 1 is a diagram illustrating the whole configuration of an information processing system 1 according to the embodiment of the present invention. As illustrated in FIG. 1, the information processing system 1 includes an information processing apparatus 10 and a detection device 20 that is worn on a hand of a user for use.

The information processing apparatus 10 is a computer that is communicatively connected to the detection device 20. For example, the computer may be a home video game machine, a personal computer or the like. As illustrated in FIG. 1, the information processing apparatus 10 includes a control unit 11, a storage unit 12, and a communication unit 13. Furthermore, in the present embodiment, the information processing apparatus 10 is also communicatively connected to a display device 14 and an object sensor 15.

The control unit 11 includes at least one processor such as a CPU (Central Processing Unit) and executes various types of information processing according to a program stored in the storage unit 12. Contents of specific processing of the control unit 11 will be described later in detail.

The storage unit 12 includes at least one memory device, and holds a program executed by the control unit 11 and data which is a target of the processing by the program. This program may be provided by being stored in a computer-readable and non-transitory storage medium and copied in the storage unit 12.

The communication unit 13 includes a serial interface such as a USB (Universal Serial Bus) or a wireless communication interface such as Bluetooth (registered trademark). The information processing apparatus 10 is communicably connected to the detection device 20 via the communication unit 13. In particular, in the present embodiment, the communication unit 13 receives information regarding the detection result transmitted from the object sensor 15 and the detection device 20. The communication unit 13 further includes a communication interface for communicating with the display device 14 wiredly or wirelessly. The information processing apparatus 10 transmits data of a video to be displayed by the display device 14 to the display device 14 via the communication unit 13.

The display device 14 displays the video based on a video signal transmitted from the information processing apparatus 10. For example, the display device 14 may be a device such as a head-mounted display that a user wears on the head for use.

The object sensor 15 is used to detect positions of a user's hand and objects present around the hand. Specifically, for example, the object sensor 15 may be a stereo camera that is directed to a position where the user's hand is assumed to be present. In this case, the object sensor 15 includes two cameras arranged side by side, and uses a parallax between the two cameras to generate a distance image (a depth map) including information regarding a distance to a subject in a visual field range. By referring to such a distance image, the information processing apparatus 10 makes it possible to comprehend a position and a shape of the user's hand by using an observation position of the object sensor 15 as a reference point. Furthermore, in the same manner, it is also possible to detect positions and shapes of various objects such as a table and a wall present around the user's hand. However, in this case, the object sensor 15 optically observes an object to be detected and detects the position of the object. Therefore, in a case where two objects overlap each other when viewed from the observation position of the object sensor 15, etc., it may be difficult to specify the exact positions of the two objects. Therefore, in a case where a finger of the user's hand contacts a surrounding object, a timing of the contact may not be accurately specified. Accordingly, in the present embodiment, the detection device 20 described below is used to specify a timing at which a finger of the user's hand contacts another object.

Figure 2:
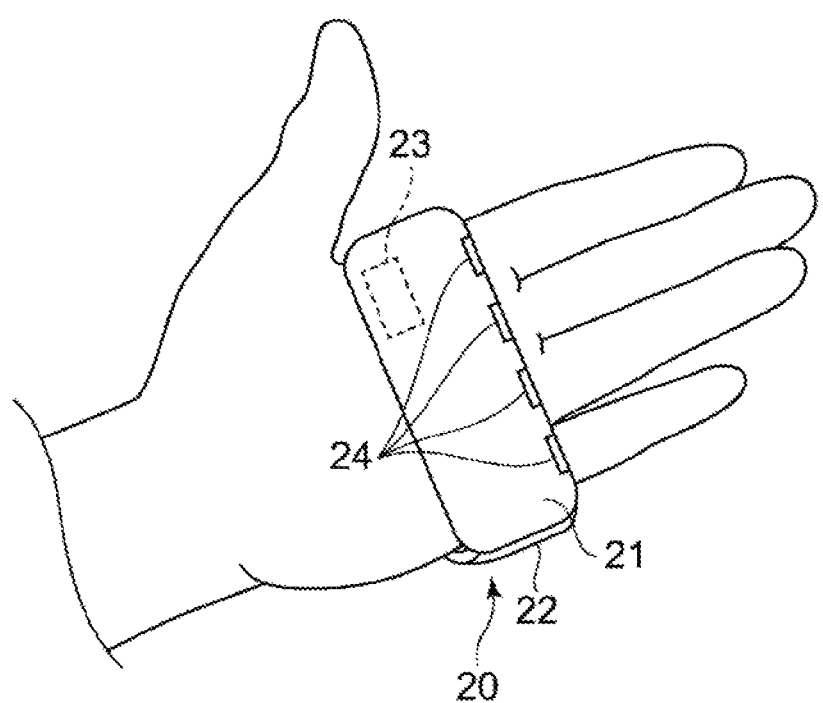
FIG. 2 is a diagram illustrating one example of an appearance of a detection device.

The detection device 20 is a device for detecting that the finger of the user's hand contacts a certain object. The detection device 20 is used by being worn on the user's hand. Here, as a specific example, the detection device 20 is worn on a palm side of the user. FIG. 2 is a diagram illustrating one example of the appearance of the detection device 20 and represents a state in which the user wears the detection device 20 on the hand. As illustrated in FIG. 2, the detection device 20 includes a main body 21 and a band 22. The user wears the detection device 20 by passing the hand through the band 22 and bringing the palm into contact with the main body 21.

An electrode 23 is exposed on a side of a surface of the main body 21 facing the user's hand, and the electrode 23 contacts the user's hand in a state where the user wears the detection device 20. The detection device 20 applies a voltage from the electrode 23 to a part of the user's hand. Hereinafter, a site of the user's hand that contacts the electrode 23 (that is, a site to which the detection device 20 applies the voltage) is referred to as an application site. The application site is not limited to a palm, but may be a back of a hand, a wrist, a part of an arm, or the like.

Furthermore, four capacitive sensors 24 are provided on the main body 21 such that the capacitive sensors 24 face four fingers excluding the user's thumb. These capacitive sensors 24 respectively form capacitors between the capacitive sensors 24 and the corresponding fingers of the user. By measuring capacitance of the capacitor, it is possible to detect the position of the user's finger. Hereinafter, the site of the user's finger that forms the capacitor by facing the capacitive sensor 24 is referred to as the detection site.

Furthermore, in the present embodiment, the detection device 20 detects a change in potential that occurred in the capacitive sensors 24 in a state where a voltage is applied from the electrode 23 to the user's hand. Information regarding the change in potential is used by the information processing apparatus 10 to determine that the user's finger contacts another object. Hereinafter, the information regarding the change in potential transmitted from the detection device 20 to the information processing apparatus 10 is referred to as potential information. The potential information may be information indicating a value of a potential measured by the capacitive sensor 24 corresponding to each finger at predetermined time intervals, for example. Moreover, hereinafter, processing by the information processing apparatus 10 to determine whether or not the user's finger contacts the other object is referred to as contact determination processing. Note that the other object to be subjected to the contact determination processing may be an object other than the user present around the user, such as a table or a wall, or a part of the user's own body, such as a user's hand which is not wearing the detection device 20.

Figure 3:
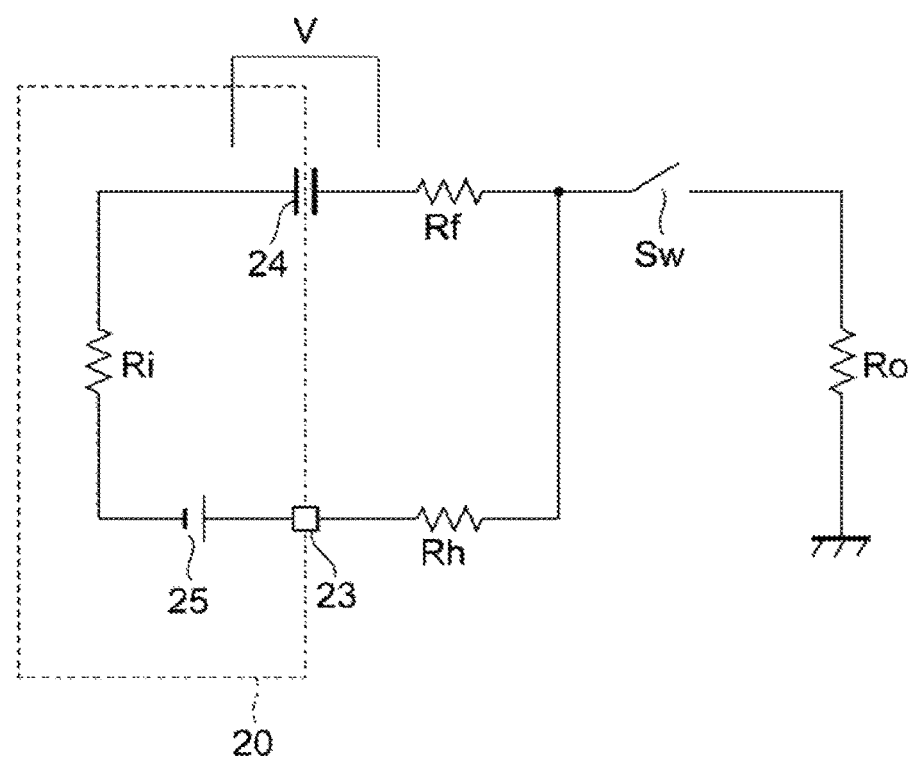
FIG. 3 illustrates diagrams explaining an operation principle of the detection device.
Figure 3:
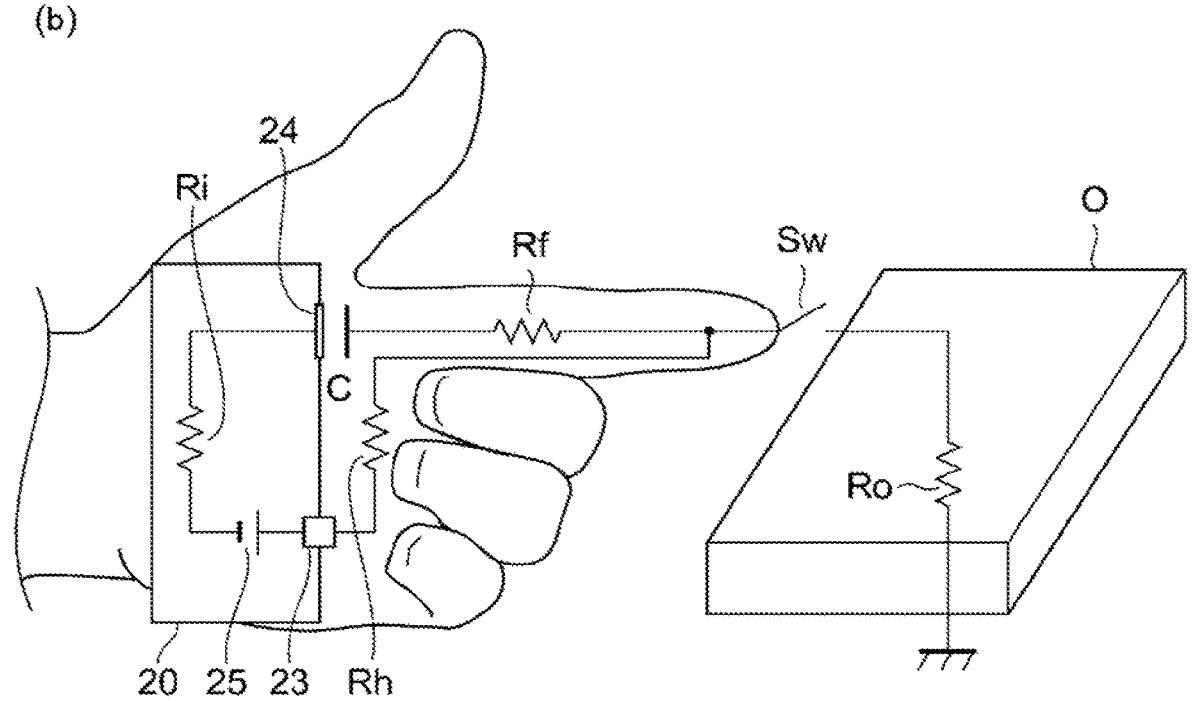

FIG. 3 illustrates diagrams explaining the operation principle of the detection device 20, and FIG. 3(a) is an equivalent circuit diagram illustrating a circuit in the detection device 20 and an outline of electrical characteristics achieved by the user's body and the like. Furthermore, FIG. 3(b) is a diagram schematically illustrating a relationship between components included in the equivalent circuit diagram of FIG. 3(a) and a real object. As illustrated in this figure, the detection device 20 includes a power supply 25 and an internal resistance Ri. Furthermore, as described above, the capacitive sensor 24 forms a capacitor C between the capacitive sensor 24 and the corresponding user's finger. Note that, in FIG. 3, only one of the plurality of capacitive sensors 24 arranged at a position facing a user's index finger is illustrated. The other capacitive sensors 24 are connected in parallel with the illustrated capacitive sensor, but illustration thereof is omitted. Furthermore, a circuit configuration in a case where a tip of the user's index finger contacts another object O having conductivity is illustrated. Hereinafter, a site of the user's finger that contacts the object O is referred to as a contact site.

A resistance Rf in the equivalent circuit indicates a resistance component possessed by the user's finger. Specifically, in this example, the resistance Rf indicates a resistance component generated by a site from the detection site to the contact site in the user's index finger. Furthermore, a resistance Rh indicates a resistance component possessed by the user's hand. More specifically, the resistance Rh indicates a resistance component generated by a site from the application site of the user's hand to the contact site. Moreover, a resistance Ro indicates a resistance component possessed by the object O that the user's index finger contacts. A switch Sw indicates whether or not there is contact between the user's index finger and the other object. That is, a state where the switch Sw is turned off corresponds to a state where the user's finger does not contact the object O, and a state where the switch Sw is turned on corresponds to a state where the user's index finger contacts the object O.

As illustrated in FIG. 3, a voltage is applied to the application site of the user's hand by the power supply 25 and the electrode 23. That is, these elements constitute the application unit that applies the voltage to the user. If the switch Sw is turned on, a current flows through the resistance Ro, and a change occurs in a voltage V of the capacitor C formed by the capacitive sensor 24 due to a voltage dividing effect. As a result, it is possible to detect that the user's finger contacts the other object O by detecting the change in potential at the detection site that occurs in the capacitive sensor 24.

In addition, in a case where an object contacted by the user's finger is an insulator having no conductivity, the current passing through the resistance Ro as described above does not flow, and thus no clear potential fluctuation due to the voltage dividing effect occurs. However, it has been found that a potential fluctuation occurs at the detection site of the contacting finger due to a bending of the finger at a time of contact and a pressure applied to the finger. Therefore, even in a case where the user's finger contacts the insulator, a timing at which the user's finger contacts the insulator is detected from the change in potential by a method such as combining with the detection result of the object sensor 15, for example. A specific example of the contact determination processing will be described later.

Figure 4:
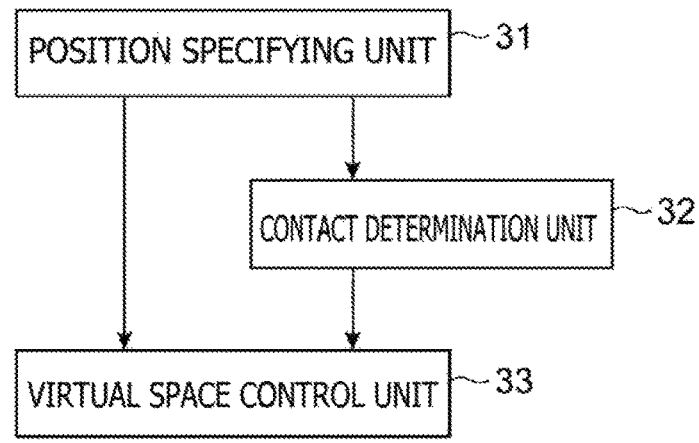
FIG. 4 is a functional block diagram illustrating functions of an information processing apparatus.

Hereinafter, functions achieved by the control unit 11 of the information processing apparatus 10 will be described. In the present embodiment, the control unit 11 includes a position specifying unit 31, a contact determination unit 32, and a virtual space control unit 33, as functionally illustrated in FIG. 4. These functions are achieved by the control unit 11 operating according to the program stored in the storage unit 12. This program may be provided to the information processing apparatus 10 via a communication network such as the Internet, or may be provided by being stored in a computer-readable information storage medium such as an optical disk.

The position specifying unit 31 uses the detection result of the object sensor 15 to specify a position and a shape of an object present within a detection range of the object sensor 15. In particular, the position specifying unit 31 specifies positions and shapes of the user's hand and objects present around the hand. It is possible to achieve the specifying of the user's hand using the detection result of the object sensor 15 by a publicly-known technique.

The contact determination unit 32 achieves the contact determination processing determining that the finger of the user's hand contacts a certain object by using the potential information received from the detection device 20. Specifically, the contact determination unit 32 acquires the potential information at predetermined time intervals from each of the four capacitive sensors 24 corresponding to each of the four fingers. Furthermore, in a case where it is determined that the change in potential satisfying a predetermined condition has occurred on the basis of the acquired potential information, it is determined that any user's finger contacts the other object at that timing.

Figure 5:
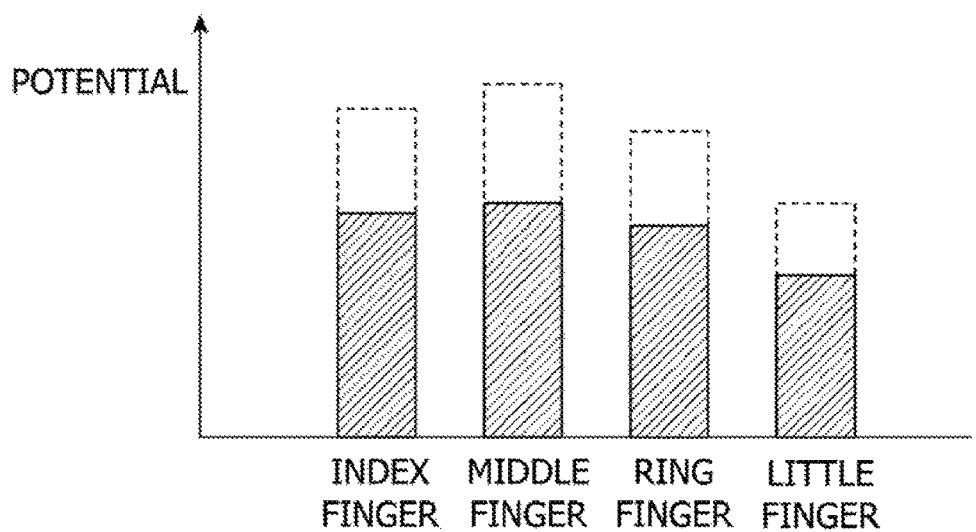
FIG. 5 is a diagram illustrating one example of a change in potential.

Here, a specific example of the contact determination processing executed by the contact determination unit 32 will be described. FIG. 5 illustrates one example of the change in potential that occurs in each of the four capacitive sensors 24 when any finger of the user contacts a conductor. Also, a broken line in this figure indicates the potential before the change, and a solid line indicates the potential after the change. As illustrated in this figure, when any finger of the user contacts the conductor, a potential drop occurs in any of the four capacitive sensors 24 due to the voltage dividing effect as described above. As a result, in a case where the potentials of all the four capacitive sensors 24 simultaneously decrease, it is determined that any one of the user's fingers contacts the conductor at that timing.

Figure 6:
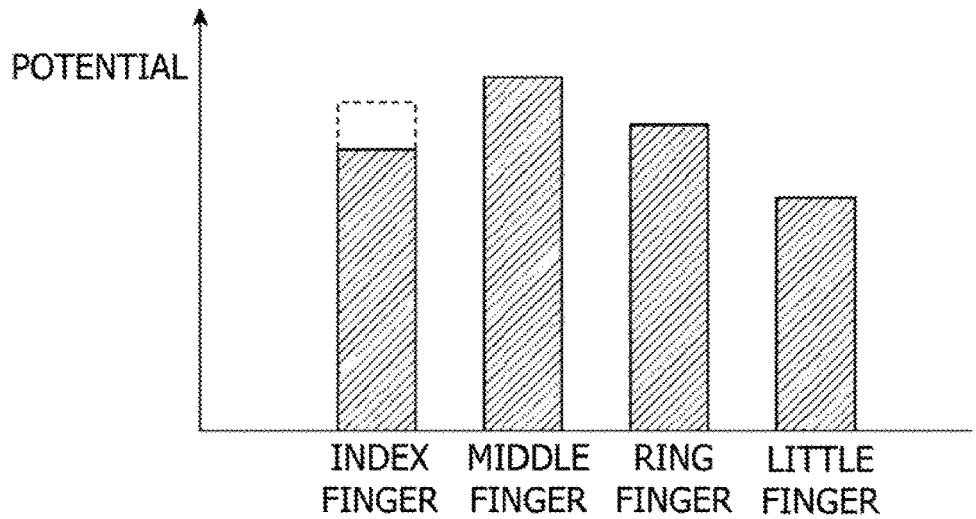
FIG. 6 is a diagram illustrating another example of a change in potential.

FIG. 6 illustrates one example of the change in potential that occurs when the user's index finger contacts the insulator. Note that, in the same manner as FIG. 5, in a case where any one of the user's fingers contacts the insulator, the potential of the capacitive sensor 24 corresponding to the contacted finger (here, the index finger) decreases as illustrated in FIG. 6. However, no change occurs for the other fingers. Therefore, in a case where the potential drop occurs in any one of the capacitive sensors 24, it is determined that the finger corresponding to the capacitive sensor 24 contacts the insulator at that timing.

However, in addition to the timing when the user's finger contacts a certain object, the potential fluctuation may occur due to other factors. Therefore, the contact determination unit 32 may execute the contact determination processing by combining not only the potential information but also information regarding the positions of the user's finger and the surrounding object around the user's finger, which are specified by the position specifying unit 31. Specifically, the contact determination unit 32 executes the contact determination processing in a case where the position of the user's finger and the position of the surrounding object satisfy a predetermined condition. The predetermined condition in this case may be a condition regarding a distance d between the user's finger and the surrounding object. For example, the contact determination unit 32 refers to the position of the user's finger and the position of the other object specified by the position specifying unit 31 and calculates the shortest distance d between the user's finger and the surrounding object. Furthermore, the contact determination unit 32 executes the contact determination processing based on the potential information as described above only while it is determined that the calculated distance d is equal to or less than a predetermined threshold Th. On the other hand, in a case where no object exists within a distance range to the threshold Th around the user's finger, the contact determination processing described above is not executed. According to this control, it is possible to more accurately specify the timing at which the user's finger contacts a certain object.

Furthermore, rather than simply starting the execution of the contact determination processing according to the distance from the user's finger to the surrounding object, the contact determination unit 32 may determine whether or not to execute the contact determination processing according to a direction in which the user's finger moves. For example, in a case where the position specifying unit 31 determines that the other object exists around the user's finger and that the user's finger is moving in a direction toward the object, the contact determination unit 32 may execute the contact determination processing according to the potential information.

The virtual space control unit 33 constructs a virtual space in which various objects are arranged. Then, an image representing a state of the virtual space is drawn and displayed on the display device 14. In particular, in the present embodiment, the virtual space control unit 33 determines contents and motions of the objects to be arranged in the virtual space by using a specification result made by the position specifying unit 31 and a determination result made by the contact determination unit 32. This makes it possible for the user to experience a state in the virtual space corresponding to a real space.

As one example, the virtual space control unit 33 arranges an object corresponding to an object around the user detected by the position specifying unit 31 in the virtual space. Hereinafter, the object corresponding to the object present around the user is referred to as a peripheral object. It is desirable that a shape of the peripheral object is roughly a shape close to a real object. On the other hand, a color of a surface and a fine shape of the surface of the surrounding object may be different from the real object. For example, the virtual space control unit 33 arranges the peripheral object having an appearance like a cockpit with a shape close to a table that actually exists, in which meters and operation panels are arranged on its surface, in the virtual space.

Furthermore, the virtual space control unit 33 arranges an object representing the user's hand (hereinafter referred to as a hand object) in the virtual space. A position and a posture of the hand object are changed in conjunction with an actual movement of the user's hand specified by the position specifying unit 31. According to this control, it is possible for the user to contact the other object in the virtual space by moving the hand as if the user is in the virtual space.

Moreover, in a case where the user contacts the object existing in the real space, the virtual space control unit 33 determines a motion by assuming that the hand object contacts the corresponding peripheral object in the virtual space. For example, it is assumed that a table is placed in front of the user in the real space, and a peripheral object having an appearance imitating a cockpit in a shape corresponding to the table is arranged in the virtual space. In this example, in a case where the user's finger contacts the table, the virtual space control unit 33 makes the hand object contact the peripheral object in the virtual space, determines that the operation panel or the like arranged at the position where the hand object contacts has been operated, and executes a process corresponding to the operation (for example, a process of changing a state of the instrument on the surface of the peripheral object).

In the above-mentioned case, the virtual space control unit 33 causes the hand object to contact a cockpit object at the timing when the contact determination unit 32 determines that the user's finger contacts the object. According to this control, it is possible to generate a reaction corresponding to the contact even in the virtual space at the timing when the user contacts the real object, and thereby, it is possible to make the user less likely to feel a sense of incongruity and enhance a sense of immersion in the virtual space.

Figure 7:
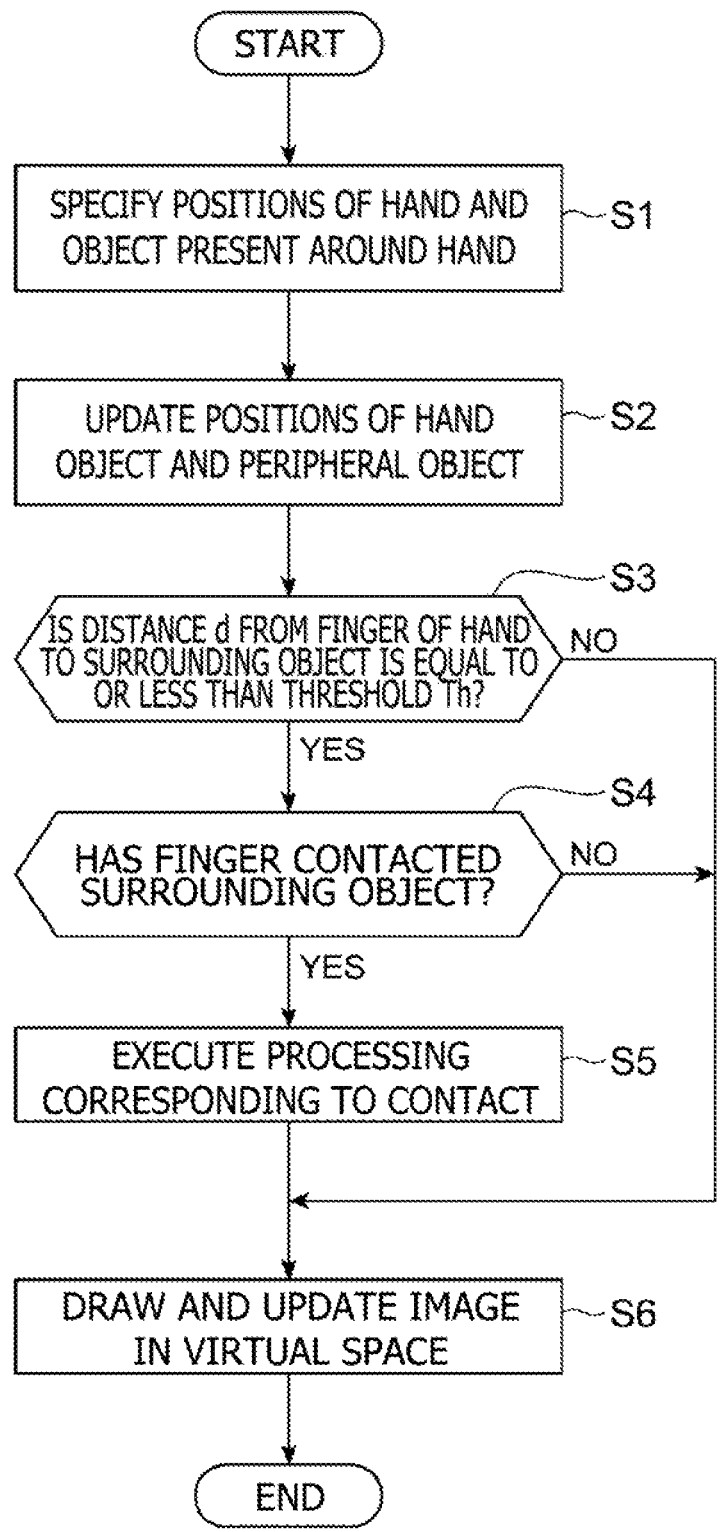
FIG. 7 is a flowchart illustrating one example of a flow of processing executed by the information processing apparatus.

Hereinafter, a specific example of the flow of processing executed by the information processing apparatus 10 according to the present embodiment will be described with reference to the flowchart of FIG. 7. Here, a flow of processing executed each time a display image displayed on the display device 14 is updated will be described.

First, the position specifying unit 31 uses the detection result of the object sensor 15 to specify the positions of the user's hand and the object present around the user's hand at a particular time (S1). Next, the virtual space control unit 33 updates the positions, in the virtual space, of the hand object corresponding to the user's hand and the peripheral object corresponding to the surrounding object, according to the positions specified in S1 (S2).

Subsequently, the contact determination unit 32 determines whether or not a distance d from a finger of the user's hand to the surrounding object is equal to or less than a threshold Th using the specification result in S1 (S3). In a case where it is determined in S3 that no other object exists within a range equal to or less than the threshold Th from the user's finger, processing of S6 is executed next. On the other hand, in a case where the distance d between the user's finger and the surrounding object is close to the threshold Th or less, the contact determination unit 32 determines whether or not the user's finger contacts the surrounding object using the potential information acquired from the detection device 20 (S4).

In a case where it is determined in S4 that there is the contact, the virtual space control unit 33 executes processing corresponding to the contact (position adjustment of the hand object, change of the appearance of the peripheral object, etc.) (S5). In both cases where the processing of S5 is executed and where it is determined that there is no contact in S4, processing of S6 is executed next.

Thereafter, the virtual space control unit 33 draws an image representing the state of the virtual space updated in S2 and S5, and displays the image on the display device 14 (S6). By repeatedly executing the processing described above, it is possible to present to the user the state in the virtual space that changes in conjunction with the movement of the user's hand in real time.

According to the information processing system 1 according to the present embodiment described above, when the user's finger contacts the other object in the real space, it is possible to accurately specify the contact timing.

Also, note that the embodiment of the present invention is not limited to that described above. For example, the shape and circuit configuration of the detection device 20 in the above description are merely examples, and different shapes that achieve the same effect may be used. Furthermore, operation buttons or the like may be disposed on the surface of the detection device 20 and may be used to accept the operation input by the user.

Furthermore, the object sensor 15 is not limited to the one described above, and may be of various types capable of specifying the positions and shapes of the user's hand and the surrounding object. For example, the object sensor 15 may be an infrared camera that detects a high-temperature place or other cameras. It is possible to specify the position of the object such as the user's hand by analyzing an image obtained by photographing the real space with these cameras. Moreover, the capacitive sensors 24 arranged in the detection device 20 may be used for measuring a distance to the user's finger in a state where no voltage is applied to the user's hand. In this case, for a purpose of specifying the shape of the user's hand, the detection result of the capacitive sensors 24 may be used.

Moreover, in the above description, although the detection device 20 is attached to the palm and used to detect that the user's finger contacts the other object, the detection device 20 may be attached to another part of the user's body and apply the voltage to a site other than the palm. Furthermore, facing positions and contact positions in the above description are merely examples, and may be another site of the user's body.

Furthermore, at least a part of the processing executed by the information processing apparatus 10 in the above description may be executed by the detection device 20. For example, the acquisition of the potential information and the contact determination processing executed by the contact determination unit 32 may be executed in the detection device 20. In this case, the detection device 20 itself singly functions also as the information processing apparatus and the information processing system according to the embodiment of the present invention.

REFERENCE SIGNS LIST

1 Information processing system, 10 Information processing apparatus, 11 Control unit, 12 Storage unit, 13 Communication unit, 14 Display device, 15 Object sensor, 20 Detection device, 21 Main body, 22 Band, 23 Electrode, 24 Capacitive sensors, 25 Power supply, 31 Position specifying unit, 32 Contact determination unit, 33 Virtual space control unit.

The invention claimed is:

1. An information processing system comprising:
   an application unit that applies a voltage to a source electrode located at a common application site of a user's body;
   a detection unit that detects a respective potential at each of a plurality of reception electrodes, each of the plurality of reception electrodes located at a respective one of a plurality of detection sites of the user's body, each of the plurality of detection sites being located at a different position from the application site, as a function of the voltage that is applied to the source electrode at the common application site; and
   a contact determination unit that determines a contact between a contact site of the user's body and an external object on a basis of a change in the potential detected by the detection unit before the contact and during the contact.

2. The information processing system according to claim 1, further comprising:
   a position specifying unit that specifies positions of a predetermined site of the user's body and the external object present around the predetermined site,
   wherein the contact determination unit determines the contact between the site of the body included in the predetermined site and the external object in a case where the positions of the predetermined site and the object satisfy a predetermined condition.

3. The information processing system according to claim 2, wherein the contact determination unit determines the contact between the contact site of the body included in the predetermined site and the external object in a case where a distance between the predetermined site and the external object is equal to or less than a predetermined threshold.

4. The information processing system according to claim 1, wherein at least one of:
   the contact site is one of a plurality of contact sites of the user's body, each of the plurality of reception electrodes and corresponding detection sites being associated with a respective one of the plurality of contact sites, and
   each of the plurality of contact sites correspond to a respective one of a plurality of fingers of the user, and
   the contact determination unit determines any of a plurality of contacts between any of the plurality of contact sites of the user's body and the external object as a function of any changes in potential detected by the detection unit before such contact and during such contact.

5. A detection device comprising:
   an application unit that applies a voltage to a source electrode located at a common application site of a user's body; and
   a detection unit that detects a respective potential at each of a plurality of reception electrodes, each of the plurality of reception electrodes located at a respective one of a plurality of detection sites of the user's body, each of the plurality of detection sites being located at a different position from the application site, as a function of the voltage that is applied to the source electrode at the common application site,
   wherein a contact between a contact site of the user's body and an external object is detectable on a basis of a change in the potential detected by the detection unit before the contact and during the contact.

6. An information processing method comprising:
   applying a voltage to a source electrode located at a common application site of a user's body;
   detecting a respective potential at each of a plurality of reception electrodes, each of the plurality of reception electrodes located at a respective one of a plurality of detection sites of the user's body, each of the plurality of detection sites being located at a different position from the application site, as a function of the voltage that is applied to the source electrode at the common application site; and
   determining a contact between a contact site of the user's body and an external object on a basis of a change in the potential acquired by the detecting before the contact and during the contact.

7. A non-transitory, computer-readable storage medium containing a computer program, which when executed by a computer, causes the computer to carry out actions, comprising:
   applying a voltage to a source electrode located at a common application site of a user's body;
   detecting a respective potential at each of a plurality of reception electrodes, each of the plurality of reception electrodes located at a respective one of a plurality of detection sites of the user's body, each of the plurality of detection sites being located at a different position from the application site, as a function of the voltage that is applied to the source electrode at the common application site; and
   determining a contact between a contact site of the user's body and an external object on a basis of a change in the potential acquired by the detecting before the contact and during the contact.

* * * * *